July 28, 1925.  
E. J. SCHOENING  
CONNECTION  
Filed Jan. 6, 1925  
1,547,617
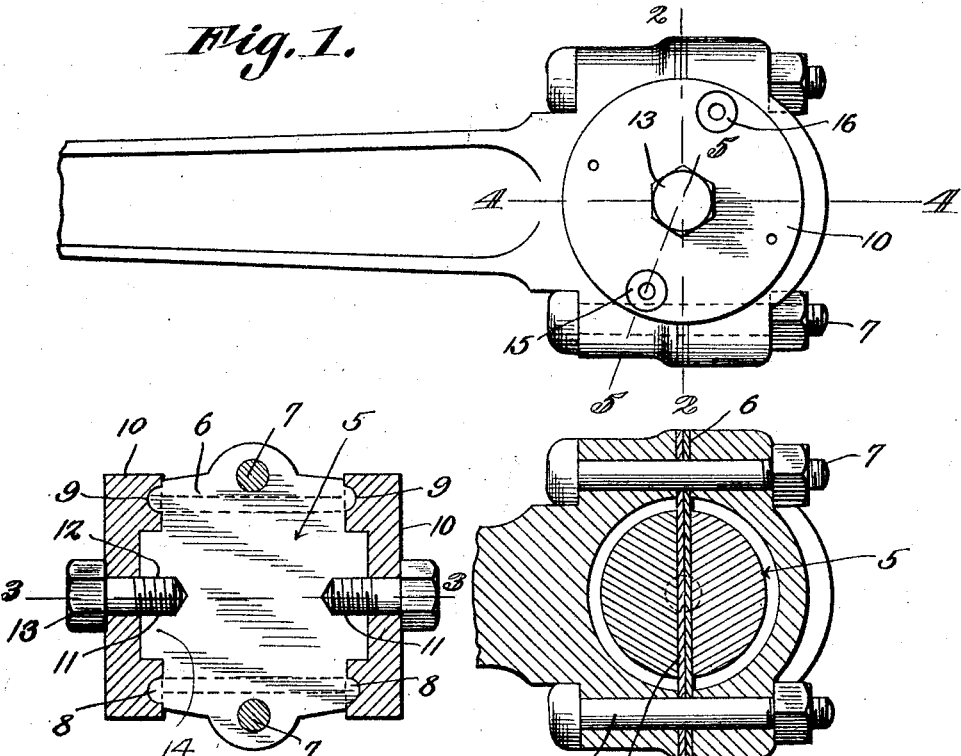
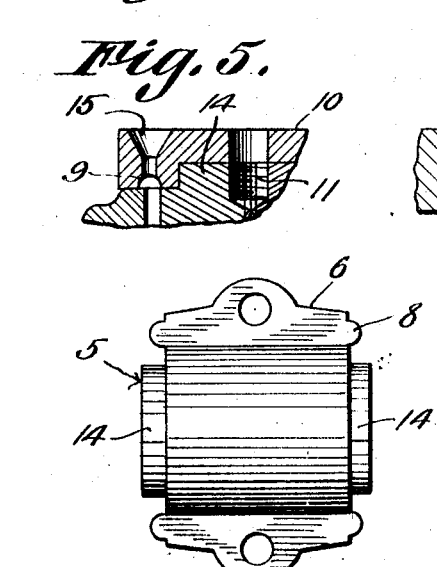
Inventor  
E. J. Schoening Patented July 28, 1925.

1,547,617

UNITED STATES PATENT OFFICE.

EMIL JOACHIM SCHOENING, OF LOUP CITY, NEBRASKA.

CONNECTION.

Application filed January 6, 1925. Serial No. 918.

*To all whom it may concern:*

Be it known that I, EMIL J. SCHOENING, a citizen of the United States, residing at Loup City, in the county of Sherman and State of Nebraska, have invented a new and useful Connection, of which the following is a specification.

This invention relates to a device especially designed for use in babbitting or rebabbitting connecting rod bearings or the like to insure an even and true surface of the bearing.

An important object of the invention is to provide a device of this character which may be readily and easily positioned for use, and one which will not require the skill of a mechanic in the operation of the device.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Referring to the drawing:

Figure 1 is a side elevational view disclosing a connecting rod supplied with a rebabbitting device constructed in accordance with the invention.

Figure 2 is a sectional view taken on line 2—2 of Figure 1.

Figure 3 is a sectional view taken on line 3—3 of Figure 2.

Figure 4 is a sectional view taken on line 4—4 of Figure 1.

Figure 5 is a sectional view taken on line 5—5 of Figure 1.

Figure 6 is a side elevational view of the device.

Referring to the drawing in detail, the device includes a separable core indicated generally by the reference character 5, each section of the core being supplied with a shim 6 secured to the flat face thereof, which shims are provided with openings to accommodate the securing bolts 7 that pass through registering openings in the connecting rod for securing the connecting rod bearing.

The shims are formed with lateral extensions 8 adapted to fit in grooves 9 of the end members 10 of the device, so that the end members will be centered to the end that when the babbitt has been poured, a true bearing will be provided. Threaded openings 11 are provided in the sections 5 and are adapted for the reception of the threaded portions 12 of the bolts 13 that pass through openings formed in the end members 10 for holding the member 5 in position.

The sections of the member 5 are also provided with reduced end portions 14 that fit in recesses formed in the end members 10 to further insure a true positioning of the member 5, and at the same time secure the end members 10 in close engagement with the connecting rod. It might be further stated that the diameter of the member 5 is less than the inner diameter of the bearing so that when the member 5 has been properly positioned, a space will be provided between the periphery of the member 5 and the bearing wall to allow the Babbitt metal to be poured thereinto.

As clearly illustrated by Figure 5 of the drawing, one of the end members 10 is provided with openings 15 and 16, respectively, the opening 15 being designed to permit the Babbitt material in a molten state to be poured into the space between the member 5 and connecting rod in which the same is positioned, while the opening 16 allows air displaced by the metal to pass therefrom.

In the use of the device the member 5 is positioned in a manner as shown by Figure 3 of the drawing and the space shown between the member 5 and bearing is filled with the babbitt in a molten state. After the Babbitt material has cooled, the device may be removed leaving the surfaces of the connecting rod and movable bearing thereof coated with the Babbitt material.

I claim:—

1. In a device of the character described, a sectional core for positioning within a bearing, shims on the sections of the core, said shims having openings, means adapted to extend through the openings for securing the core to the connecting rod, extensions on the shims, removable end members having grooves adapted to receive the extensions to hold the end members against lateral movement, and the space between the core and bearing adapted to receive molten metal.

2. In a device of the character described, a sectional core for positioning within a bearing, shims held between the sections of the core, said sections having threaded openings in their ends, removable end members having openings adapted to register with the threaded openings, bolts extending through the openings and adapted to be positioned within the threaded openings to removably secure the end members, and means carried by the shims and cooperating with the end members for holding the core in spaced relation with the bearing in which it is positioned.

3. In a device of the character described, a sectional core for positioning within a bearing, shims held between the sections of the core, said shims having end members formed with openings, the sections of the core adapted to be positioned on the shims, bolts extending through the openings to hold the shims in position, removable end members secured to the core, and means carried by the shims and engaging the end members for holding the core in spaced relation with the end members.

In testimony that I claim the foregoing as my own I have hereto affixed my signature in the presence of two witnesses.

EMIL JOACHIM SCHOENING.

Witnesses:
    JOHN R. LONG,
    ROY CHAPMAN.